May 24, 1927.
S. SHAFER, JR
1,630,221
LOADING SKIP FOR CONCRETE MIXERS
Filed May 13, 1926
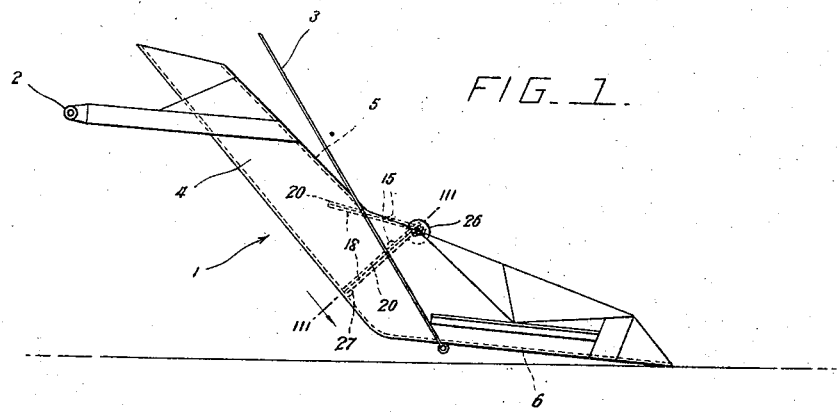
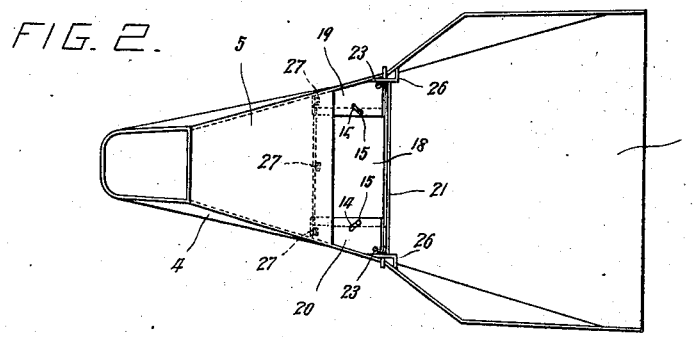
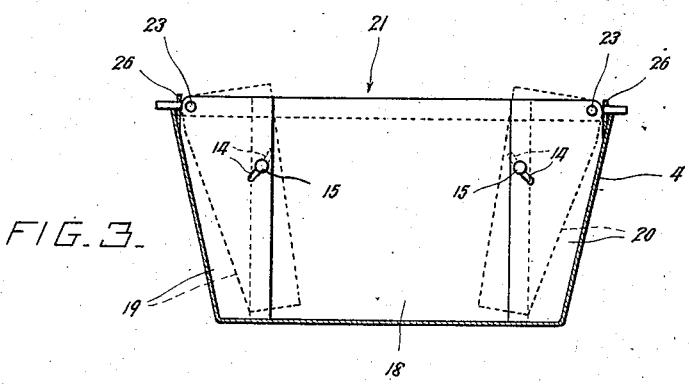
Inventor
Samuel Shafer Jr.
By John S. Barker
Attorney Patented May 24, 1927.

1,630,221

UNITED STATES PATENT OFFICE.

SAMUEL SHAFER, JR., OF MILWAUKEE, WISCONSIN, ASSIGNOR TO CHAIN BELT COMPANY, OF MILWAUKEE, WISCONSIN, A CORPORATON OF WISCONSIN.

LOADING SKIP FOR CONCRETE MIXERS.

Application filed May 13, 1926. Serial No. 108,958.

It is customary in the building of concrete roads to charge the concrete paving mixer machine that is used with measured batches of concrete aggregate. These batches are commonly conveyed to the mixing machine in batch boxes, each holding a single measured batch of aggregate, which are transported by trucks or on industrial railway cars from the measuring plant, where the sand and stone to be used in the road construction are stored in bulk, and where frequently the cement is also stored. However, it is sometimes found desirable to stock the cement to be used in conveniently placed piles along the course of the work, and to dump into the loading skip of the mixing machine after each batch of coarse aggregate of sand and stone has been charged into the same, as much cement as is required, taken from one of such piles. This latter procedure is followed where there is so much moisture in the coarse aggregate as to cause the cement, if placed in the batch box at the measuring plant, to take an initial set before it is delivered to and treated in the mixing machine. This is also desirable where, due to high winds, there is the liability of considerable loss of cement while being transported with the coarse aggregate.

When the cement is charged into the power loading skip separately from the coarse aggregate I have found it of advantage to keep it separate from such aggregate until the moment of discharging the load from the skip into the mixer, because when the cement is dumped directly into the loading section of the skip along with the coarse aggregate, or upon the top of the latter, more or less of the cement sticks to the sides of the skip, thus entailing loss, and additional labor to keep the skip clean and the inner walls thereof smooth, so that the charge will slide freely into the mixer when the skip is elevated.

My invention has for its object to construct a skip so that the cement of the charge is kept separate from the coarse aggregate until the moment of delivery of the charge to the mixer, as will be described.

While my invention is particularly useful in connection with the loading skip for concrete paving machines it will be readily seen that it may be used in connection with concrete mixers of other types.

In the accompanying drawings—

Figure 1 is a side elevation of a power-operated loading or charging skip for a concrete mixer to which my invention is applied, part of the near side wall of the skip being broken away.

Fig. 2 is a plan view of the same.

Fig. 3 is a sectional view on the line III—III of Fig. 1.

Referring to the drawings, 1 designates a loading skip of well known construction. It is arranged to be pivotally connected, as at 2, to the frame of a concrete mixer in connection with which it is used. 3 indicates one of the cables by which the skip is operated in a well known manner.

The skip is formed with a spout section 4, through which the aggregate of solid material which enters into the formation of a batch of concrete is delivered to the rotating drum of the paver or other mixing machine, and with an open section 6 having sides flaring toward the rear, into which the coarse aggregate is charged, from batch boxes, trucks, wheel barrows, or otherwise. When the skip is in its lowered position, as represented in Fig. 1, the section 6 rests upon the ground to facilitate its being loaded.

5 indicates a cover for the forward portion of the spout section of the skip, the rear portion of the spout and the loading section 6 being open or uncovered. Between the spout and the loading sections of the skip, preferably at the base or rear of the spout, I arrange a movable partition separating these two sections. This partition is preferably formed of three parts, designated respectively, 18, 19 and 20, and these are supported upon a shaft 21 that extends from side to side of the skip, the ends of the shaft being shaped to form trunnions that are mounted in bearings 26 attached to the sides of the skip near the upper edges thereof at about the line where the spout and loading sections merge into each other. The central section 18 of the partition is preferably rectangular and is secured fast to the shaft 21. The outer sections 19 and 20 of the partition are pivotally united, at 23, 23, respectively, with the cross shaft 21 near their upper outer corners, and have their inner edges overlapping the edges of the central section 18, to which they are connected by headed pins 15 carried by the section 18 and extending through slots 14 in the end sections of the partition, these slots being on short arcs struck from the pivots 23, respectively. The outer edges of the end sections of the partition are inclined relative to the other edges of such sections, as represented in Figs. 2 and 3, so that the partition will conform to the tapering or inclined walls of the spout section of the skip. 27 indicates stops with which the outer edges of the sections of the partition engage, when the partition is in its lower or normal position, and which serve to hold the partition in this position, as represented in Figs. 1 and 2.

It will be seen that the partition separating the loading section 6 from the spout section of the skip serves to form a chamber, at the base of the spout and below the opening between the lower edge of the cover 5 and the pivot shaft 21, which I utilize as a receptacle for the cement. This arrangement insures that the coarse aggregate and the cement of the charge shall be maintained entirely separate from each other until the skip is tilted to discharge into the mixing machine, and renders it entirely practical for the two sections of the skip—the cement section and the coarse aggregate section—to be simultaneously loaded, or either to be loaded in advance of the other as may be found most desirable under the circumstances.

It will be understood that the normal position of the partition is that represented in full lines in Figs. 1 and 3, that is, lowered with its edge resting upon the stops 27. When the skip is raised to discharge, the cement slides forward through the spout, and the coarse aggregate moves forwardly, gradually raising the partition to the position indicated in dotted lines in Fig. 1. It will be seen that the sand and stone constituting the coarse aggregate do not come into engagement with the upper surfaces of the partition, and that the cement does not come into engagement with the lower surfaces thereof. From this it follows that those portions of the partition with which the cement comes in contact are never wet by the coarse aggregate, no matter what may be its condition as to the water content which it may carry.

It will be seen that the outer edges of the sections 19 and 20 of the partition engage, when the partition is in its lower normal position, with the walls of the spout at a place where the spout is wider than that engaged by the partition when lifted to permit the passage of the coarse aggregate. In Fig. 3 of the drawings the positions that the parts of the partition occupy when in their lower normal positions is represented in full lines, and the positions they occupy when the partition is raised is represented by dotted lines. This view shows that in moving from one position to the other the outer sections of the partition turn about their pivots 23; but in so doing the outer sections 19 and 20 of the partition maintain engagement at all times with the inner surfaces of the side walls of the spout.

What I claim is:

1. In combination with a charging skip for concrete mixers formed with a spout section and a large loading section for the coarse aggregate, a partition separating the said two sections, and forming a chamber for the cement at the base of the spout section, the partition being movable to permit the coarse aggregate to pass when the skip is tilted to discharge.

2. The combination with a charging skip for concrete mixers formed with a spout section and a large loading section for the coarse aggregate, of a partition forming a chamber for the cement at the base of the spout section, the partition being pivotally supported at its upper edge and arranged to normally occupy a position separating the two sections of the skip, and being arranged to move to permit the coarse aggregate to pass when the skip is tilted to discharge.

3. The combination with a charging skip for concrete mixers formed with a tapering spout section and a large loading section for the coarse aggregate, of a partition separating the two sections and forming a chamber for the cement at the base of the spout section, the partition being movable to permit the coarse aggregate to pass when the skip is tilted to discharge, and formed of separate sections movable relative to each other to permit the partition to conform to the walls of the spout as it moves therein.

4. The combination with a charging skip for concrete mixers formed with a tapering spout section and a large loading section for the coarse aggregate, of a partition separating the said two sections, pivotally supported at its upper edge in the spout and formed of separate sections, the partition being arranged to turn on its pivots to permit the passage of the coarse aggregate when the skip is tilted to discharge and the sections of the partition being movable relative to each other to permit the partition to conform to the spout as it swings on its pivot.

5. In combination with a charging skip for concrete mixers formed with a spout section and a large open charging section for the coarse aggregate, a cover for the forward part of the spout section, a pivoted partition separating the two sections of the skip, the pivotal line of the partition being in rear of the rear edge of the cover for the spout section, whereby is formed a chamber for the cement at the base of the spout section that is open from above and is separated from the loading section, the partition being movable on its pivots to permit the coarse aggregate to pass when the skip is tilted to discharge.

6. The combination with a charging skip for concrete mixers formed with a spout section and a loading section for the coarse aggregation, of a partition separating the two sections and comprising a pivot shaft extending across the skip at the base of the spout, a central partition part secured fast to the shaft and side partition parts pivotally connected with the shaft at their upper outer corners and arranged along their inner edges to overlie the central part of the partition, the outer edges of the side parts of the partition being in engagement with the side walls of the spout section, and means for uniting the side sections and the central section of the partition and limiting the movements of the former relative to the latter.

SAMUEL SHAFER, Jr.